US010482253B2

(12) United States Patent
Robison et al.

(10) Patent No.: US 10,482,253 B2
(45) Date of Patent: Nov. 19, 2019

(54) CONFIGURING BASIC INPUT OUTPUT SYSTEM (BIOS) FEATURES BASED ON A POLICY

(71) Applicant: Dell Products L. P., Round Rock, TX (US)

(72) Inventors: Charles D. Robison, Buford, GA (US); Ricardo L. Martinez, Leander, TX (US); Joseph Kozlowski, Hutto, TX (US); Daniel L. Hamlin, Round Rock, TX (US)

(73) Assignee: Dell Products L. P., Round Rock, TX (US)

( * ) Notice: Subject to any disclaimer, the term of this patent is extended or adjusted under 35 U.S.C. 154(b) by 103 days.

(21) Appl. No.: 15/941,728

(22) Filed: Mar. 30, 2018

(65) Prior Publication Data

US 2019/0303578 A1 Oct. 3, 2019

(51) Int. Cl.

| | |
|---|---|
| ***G06F 9/32*** | (2018.01) |
| ***G06F 9/44*** | (2018.01) |
| ***G06F 21/57*** | (2013.01) |
| ***H04L 9/30*** | (2006.01) |
| ***H04L 9/32*** | (2006.01) |
| ***G06F 9/445*** | (2018.01) |

(52) U.S. Cl.

CPC ........ *G06F 21/572* (2013.01); *G06F 9/44505* (2013.01); *H04L 9/30* (2013.01); *H04L 9/3263* (2013.01)

(58) Field of Classification Search

CPC .... G06F 9/44502; G06F 9/44508; G06F 1/24; G06F 9/44526; G06F 15/177; G06F 9/44514; G06F 9/44523; G06F 11/1417; G06F 9/44505

See application file for complete search history.

(56) References Cited

U.S. PATENT DOCUMENTS

| | | | | |
|---|---|---|---|---|
| 5,854,905 A * | 12/1998 | Garney ................. | G06F 9/4406 | 710/104 |
| 8,019,994 B2 * | 9/2011 | Rios ...................... | G06F 21/572 | 380/277 |
| 2009/0307476 A1 * | 12/2009 | Khatri ................... | G06F 9/4401 | 713/2 |
| 2012/0131317 A1 * | 5/2012 | Hauck ................... | G06F 21/572 | 713/1 |

(Continued)

*Primary Examiner* — Zahid Choudhury

(74) *Attorney, Agent, or Firm* — Shiv S. Naimpally; Campbell Stephenson LLP

(57) ABSTRACT

In some examples, a computing device may receive (i) settings associated with one or more features of a basic input output system (BIOS) of the computing device and (ii) a device identifier that uniquely identifies the computing device. The computing device may determine a policy identifier that identifies a policy being implemented by the settings associated with the one or more features of the BIOS. The computing device may retrieve a public key associated with an organization that acquired the computing device and sending a request to a service to validate the policy. The request may include the policy identifier and the public key. After the computing device receives a response from the service indicating that the policy is valid, the computing device may initiate a reboot and modify, during the reboot, the one or more features of the BIOS of the computing device based on the settings.

20 Claims, 10 Drawing Sheets

(56) References Cited

U.S. PATENT DOCUMENTS

2012/0198224 A1* 8/2012 Leclercq ................. H04L 9/083
713/2
2016/0012234 A1* 1/2016 Anderson ............. G06F 21/575
713/2
2016/0381075 A1* 12/2016 Goyal ..................... H04L 63/20
713/176

* cited by examiner

CONFIGURING BASIC INPUT OUTPUT SYSTEM (BIOS) FEATURES BASED ON A POLICY

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The BIOS of a computing device (e.g., a type of IHS) may be used to control various aspects of the computing device. For example, the BIOS may be used to customize, provision, manage, and/or secure the computing device. Because unauthorized changes to the BIOS may be used to compromise the computing device's availability or compromise the integrity and/or confidentiality of data stored within the computing device, each BIOS may be protected using a password or similar mechanism. However, password protecting access to each BIOS may not scale to large (e.g., enterprise) infrastructures that include hundreds or thousands of computing device, and thus falls short of meeting the needs of enterprises undergoing acquisitions, reorganizations, infrastructure updates, end-of-life (EOL) or other lifecycle changes.

In addition, a distributor may provide products and services that include customizing the BIOS to the specific needs of an enterprise. The distributor may find modifying each BIOS of a multitude of devices for an enterprise customer to be a time consuming and error prone process.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may receive (i) settings associated with one or more features of a basic input output system (BIOS) of the computing device and (ii) a device identifier that uniquely identifies the computing device. The computing device may determine a policy identifier that identifies a policy being implemented by the settings associated with the one or more features of the BIOS. The computing device may retrieve a public key associated with an organization that acquired the computing device and sending a request to a service to validate the policy. The request may include the policy identifier and the public key. After the computing device receives a response from the service indicating that the policy is valid, the computing device may initiate a reboot and modify, during the reboot, the one or more features of the BIOS of the computing device based on the settings.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
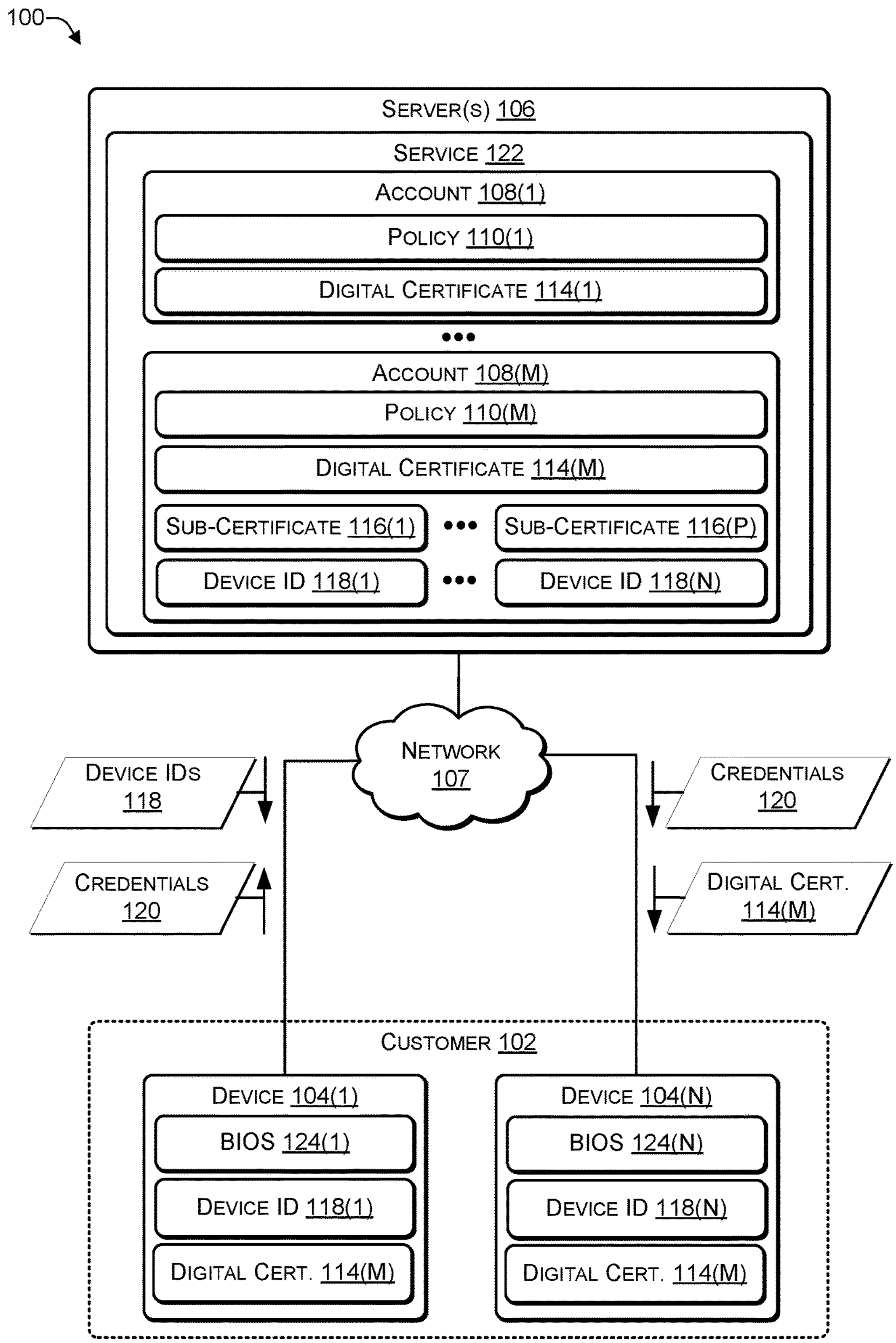
FIG. 1 is a block diagram illustrating an architecture that includes provisioning an account to enable the account to be access using a digital certificate according to some implementations.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a customer or a solution provider to create and access an account with a BIOS access control service. The account may enable the customer or the solution provider to specify one or more policies and to automatically create customized BIOS feature settings that implement the policies. The systems and techniques may enable a customer or a solutions provider to create an account to configure and manage the BIOS of multiple devices associated with the customer throughout the lifecycle of the devices, e.g., from cradle (e.g., initial delivery) to grave (e.g., end-of-life). The customer or the solution provider may be provided with a digital certificate to access the account and to prevent unauthorized parties from accessing the account.

A customer may purchase multiple devices, create an account using a BIOS Access Control Service, purchase a package to automatically (e.g., without human interaction) set BIOS features in the BIOS of each of the multiple devices, securely download the package, deploy the package to the multiple devices seamlessly, such that a desired policy (or set of policies) is automatically installed on each of the multiple devices and automatically verified for integrity. The policy (or set of policies) may be compiled to create BIOS settings or to create a modified BIOS that implements the policy. The BIOS settings implementing the policy or the modified BIOS may be installed onto each of the customer's devices.

To illustrate, a customer may purchase multiple computing devices. Each computing device may be equipped with one or more cameras, one or more microphones, and other input/output (I/O) devices. The customer may be concerned that an unauthorized user (e.g., a hacker, a competitor, a disgruntled employee, or the like) could remotely (e.g., over a network) take control of the I/O devices to obtain confidential information. To prevent the I/O devices from being hijacked by an unauthorized user, the customer may create a policy that configures the BIOS to disable I/O devices, such as, for example, the cameras, the microphones, and the like.

As a first example, a software agent associated with an organization that acquired the computing device may download an encrypted package from a service. The encrypted package may include the policy and a plurality of device identifiers. The software agent may compile the policy to create settings associated with the one or more features of a basic input output system (BIOS). The software agent may send an executable file to a particular computing device of a plurality of computing devices acquired by the organization. The executable file may include the settings associated with the one or more features of the BIOS and a particular device identifier of the plurality of device identifiers that corresponds to the particular computing device. The particular computing device may include one or more processors and one or more computer readable storage media storing instructions that are executable by the one or more processors to perform various operations. For example, the operations may include receiving settings associated with one or more features of a basic input output system (BIOS) of the computing device and receiving a device identifier that uniquely identifies the computing device. The settings associated with the one or more features of the BIOS may include at least one of: disabling an imaging device associated with the computing device, disabling a microphone associated with the computing device, or disabling a port associated with the computing device. The operations may include determining a policy identifier that identifies a policy being implemented by the settings associated with the one or more features of the BIOS, retrieving a public key associated with an organization that acquired the computing device and sending a request to a service to validate the policy. The request may include the policy identifier and the public key. After receiving a response from the service indicating that the policy is valid, the operations may include initiating a reboot and modifying the one or more features of the BIOS of the computing device based on the settings. The settings associated with the one or more features of the BIOS may include a policy identifier identifying a particular policy of a plurality of policies. The settings may implement the particular policy.

As a second example, a computing device may include one or more processors and one or more non-transitory computer-readable storage media to store instructions executable by the one or more processors to perform various operations. For example, the operations may include receiving settings associated with one or more features of a basic input output system (BIOS) of the computing device, receiving a device identifier that uniquely identifies the computing device, determining a policy identifier that identifies a policy being implemented by the settings associated with the one or more features of the BIOS, retrieving a public key associated with an organization that acquired the computing device, and sending a request to a service to validate the policy. The request including the policy identifier and the public key. The operations may include receiving a response from the service. Based at least in part on determining that the response indicates that the policy is valid, the operations may include initiating a reboot and modifying, during the reboot, the one or more features of the BIOS of the computing device based on the settings. Based at least in part on determining that the response indicates that the policy is invalid, the operations may include deleting the settings associated with the one or more features of the BIOS and providing a message indicating that the settings are invalid. The settings associated with the one or more features of the BIOS may include at least one of: disabling a camera associated with the computing device, disabling a microphone associated with the computing device, or disabling a port associated with the computing device. The policy may be compiled to create the settings associated with the one or more features of the BIOS. The service may include an account associated with the organization. The account may include the policy. The account may be accessed by presenting a digital certificate associated with the account. The policy may be created by a solution provider that is different from the organization. The settings associated with the one or more features of the BIOS may include a policy identifier identifying a particular policy of a plurality of policies. The settings may implement the particular policy.

As a third example, a computing device may include one or more processors and one or more non-transitory computer-readable storage media to store instructions executable by the one or more processors to perform various operations. For example, the operations may include receiving settings associated with one or more features of a basic input output system (BIOS) of the computing device, receiving a device identifier that uniquely identifies the computing device, determining a policy identifier that identifies a policy being implemented by the settings associated with the one or more features of the BIOS, initiating a reboot, and modifying, during the reboot, the one or more features of the BIOS of the computing device based on the settings. The operations may include retrieving a public key associated with an organization that acquired the computing device and sending a request to a service to validate the policy. The request may include the policy identifier and the public key. The operations may include receiving a response from the service. Based at least in part on determining that the response indicates that the policy is valid, the operations may include marking the BIOS as validated. Based at least in part on determining that the response indicates that the policy is invalid, the operations may include restoring the one or more features of the BIOS to one or more previous settings, deleting the settings associated with the one or more features of the BIOS, and providing (e.g., displaying to a user or sending to a system administrator) a message indicating that the settings are invalid. The settings associated with the one or more features of the BIOS may include at least one of: disabling a camera associated with the computing device, disabling a microphone associated with the computing device, or disabling a port associated with the computing device. The policy may be compiled to create the settings associated with the one or more features of the BIOS. In some cases, a software agent associated with the organization may download an encrypted package from the service. The encrypted package may include the policy and a plurality of device identifiers. The software agent may send an executable file to a particular computing device of a plurality of computing devices acquired by the organization. The executable file may include the settings associated with the one or more features of the BIOS and a particular device identifier of the plurality of device identifiers that corresponds to the particular computing device. The settings associated with the one or more features of the BIOS may include a policy identifier identifying a particular policy of a plurality of policies. The settings may implement the particular policy.

FIG. 1 is a block diagram illustrating an architecture 100 that includes provisioning an account to enable the account to be accessed using a digital certificate according to some implementations. A customer 102 may acquire (e.g., purchase or lease) multiple computing devices, such as, for example, devices 104(1) to 104(N) (where N>1). The customer 102 may be an organization (e.g., an enterprise) such as a corporation. For example, the devices 104 may be manufactured by Dell®, HP®, Lenovo®, or another computer manufacturer. Each device may include a basic input/output system (BIOS). For example, the device 104(1) may include a BIOS 124(1) and the device 104(N) may include a BIOS 124(N).

The devices 104 may be communicatively coupled to one or more servers 106 via a network 107. The network 107 may include wireless technologies and/or wired technologies. For example, the wireless technologies may include one or more of 802.11/Wi-Fi®, Bluetooth®, code division multiple access (CDMA), global system for mobile (GSM), universal mobile telephone service (UMTS), another type of wireless communications technology, or any combination thereof. The wired technologies may include Ethernet, Data Over Cable Service Interface Specification (DOCSIS), digital subscriber line (DSL), another type of wired technology, or any combination thereof.

The server 106 may host multiple accounts, such as an account 108(1) to an account 108(M) (where M>0). Each account 108 may include at least one policy 110 and a digital certificate 114 to enable each customer to access a corresponding account while preventing unauthorized access. To illustrate, the account 108(1) may include a policy 110(1) and a digital certificate 114(1).

The customer 102 may request an account to enable the customer 102 to control the BIOS 124(1) to 124(N) associated with the computing devices 104(1) to 104(N). In response to the request, the servers 106 may create the account 108(M) associated with the customer 102. The account 108(M) may include the policy 110(M). The servers 106 may create the digital certificate 114(M) and provide the digital certificate 114(M) to the customer 102 to enable the customer 102 to access the account 108(M). For example, to access the account 108(M), the customer 102 may present credentials 120, such as the digital certificate 114(M), to the server 106. In response, the server 106 may authenticate the credentials 120, such as the digital certificate 114(M), before allowing the customer 102 to access the account 108(M). By providing the customer 102 with the digital certificate 114(M), access to the account 108(M) may be restricted to authorized users, such as the customer 102, thereby preventing unauthorized access. In some cases, sub-servient certificates, such as, for example, sub-certificates 116(1) to 116(P) (P>0) may be created. For example, when a user presents the credentials 120 that include one of the sub-certificates 116, the servers 106 may allow the user to view but not modify the contents of the account 108(M). As another example, when a user presents the credentials 120 that includes one of the sub-certificates 116, the servers 106 may allow the user to view and modify the policy 110(M) as well as view but not modify other contents of the account 108(M).

The servers 106 may create a unique device identifier (ID) for each of the customer's devices 104. For example, the servers 106 may create a device ID 118(1) corresponding to the device 104(1) and a device ID 118(N) corresponding to the device 104(N). The servers 106 may send the device IDs 118, over the network 107, to the corresponding devices 104 of the customer 102. For example, the servers 106 may send the device ID 118(1) to the device 104(1) and send the device ID 118(N) to the device 104(N). In this way, each of the devices 104(1) to 104(N) may be provided with a unique device ID. The service 122 may provide the digital certificate 114(M) to each of the devices 104(1) to 104(N) to prevent unsigned (e.g., unauthorized) parties from modifying the BIOS 124 of each of the devices 104.

In some cases, the customer 102 may use a local application to manage and distribute the device IDs 118. For example, the local application may receive the device IDs 118 from the servers 106 and then provide each of the devices 104 with a particular one of the device IDs 118.

Thus, a customer may acquire (e.g., purchase or lease) multiple devices, such as, for example, laptops, notebooks, tablets, desktops, phones, another type of computing device or any combination thereof. The customer may create an account with a BIOS access control service 122 hosted by one or more servers. The BIOS access control service 122 may create a set (e.g., one or more) credentials, such as a digital certificate, to enable customer access to the account while preventing modifications to the BIOS of the customer's devices by external, non-credentialed entities. The customer may use the digital certificate to create subservient credentials for other authorized users and services. The BIOS access control service 122 may create a unique device ID for each device that the customer has acquired and send a unique device ID to a corresponding one of the acquired devices.

Figure 2:
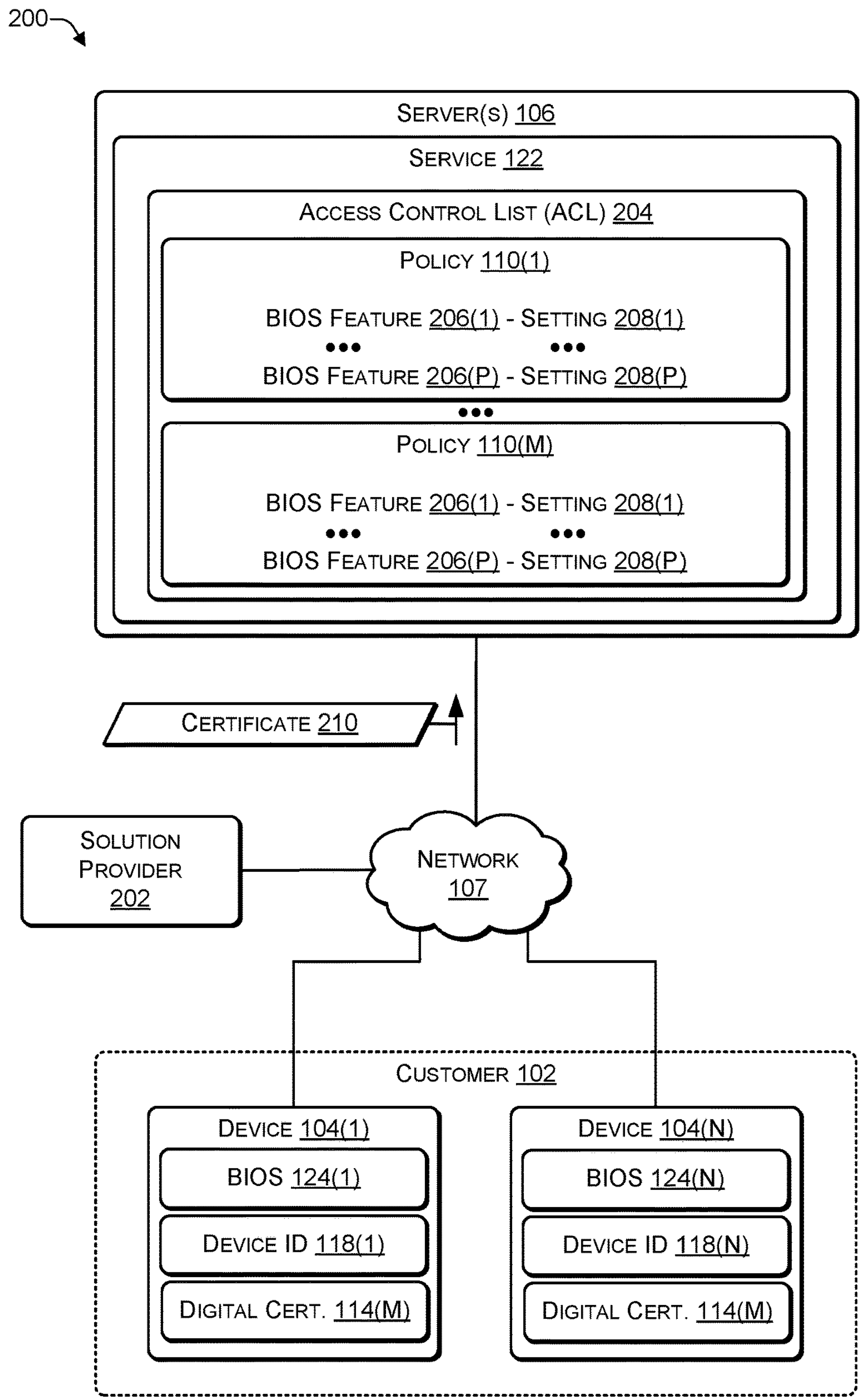
FIG. 2 is a block diagram illustrating an architecture that includes using an access control list to manage multiple policies according to some implementations.

FIG. 2 is a block diagram illustrating an architecture 200 that includes using an access control list to manage multiple policies according to some implementations. In some cases, a solution provider 202 may create an account with the service 122. For example, the customer 102 may provide the solution provider 202 with specifications for the computing devices that the customer 102 desires to acquire and the solution provider 202 may work with a particular computer manufacturer to provide the devices 104 to the customer 102.

The solution provider 202 may create one or more of the policies 110. For example, one of the policies 110 may specify that the camera (or other imaging device) and microphone included in the devices 104 are disabled to prevent a third party from hijacking the camera and microphone to obtain confidential information. As another example, one of the policies 110 may specify that each of the devices 104 have a unique device ID to enable each of the devices 104 to be tracked.

An access control list 204 may be managed by a manufacturer of the devices 104 and used to control access (e.g., permissions) for solution providers, such as the solution provider 202, to control BIOS features using the service 122. In some cases, the provisioning of policies may be iterative. The service 122 may use hierarchical controls for overwriting policies or replacing policies and to avoid policy collisions. The service 122 may enable solutions providers, such as the solution provider 202, to provision based on multiple certificates for multiple policies. For example, a certificate 210 may enable the solution provider 202 to access multiple policies for multiple customers that use the solution provider 202.

Each of the policies 110 may be created to include custom device BIOS feature settings. For example, each of the policies 110 may have multiple BIOS features 206(1) to 206(P) and each of the BIOS features 206 may have a corresponding setting 208. To illustrate, for the BIOS feature 206(1), each of the policies 110 may specify a particular setting 208(1) and for the BIOS feature 206(P), each of the policies 110 may specify a particular setting 208(P). For example, the BIOS features 206 may include at least one imaging device (e.g., camera), at least one microphone, various input/output ports (e.g., universal serial bus (USB) port, ThunderBolt® port, Ethernet® port, and the like), and other components of the devices 104. The settings 208 may specify which of the imaging devices are enabled and which are disabled, which microphones are enabled and which are disabled, which ports are enabled and which ports are disabled, which components are enabled and which components are disabled, and the like. For example, the BIOS feature settings may specify that a particular component, such as a webcam (e.g., imaging device), is normally disabled but may be enabled when a specific application, such as a video conferencing application (e.g., Skype®), is executing. As yet another example, the BIOS feature settings may specify that a particular component, such as a user-facing webcam (e.g., imaging device) is enabled (e.g., to allow a user to engage in video conferencing), while another similar component, such as an external-facing webcam, is disabled. As a further example, for security purposes, all imaging devices and all microphones included in a device may be disabled using the BIOS feature settings. As another example, the BIOS feature settings may specify that a specific set of ports (e.g., ThunderBolt®) are disabled while other ports (e.g., USB) are enabled.

Figure 3:
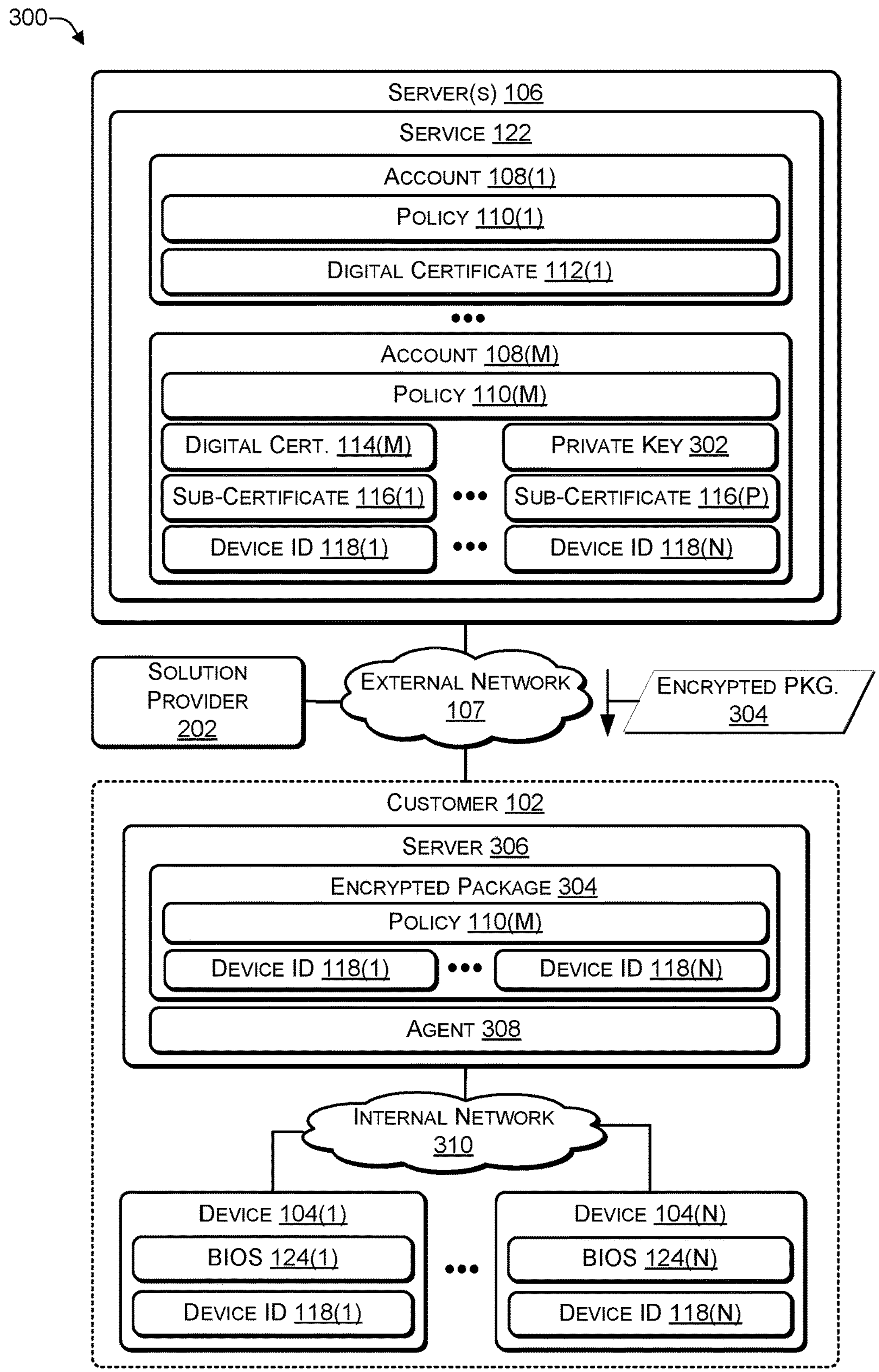
FIG. 3 is a block diagram illustrating an architecture that includes downloading a policy package according to some implementations.

FIG. 3 is a block diagram illustrating an architecture 300 that includes downloading a policy package according to some implementations. After the customer 102 purchases a policy package (e.g., that includes one of the policies 110), the device IDs 118 associated with the devices 104 along with the purchased policy, such as the policy 110(M), may be encrypted with private key 302 of the digital certificate 114(M) to create an encrypted package 304. If the customer 102 purchases a policy package from a device manufacturer (e.g., Dell®, HP®, Lenovo®, or the like) then the device manufacturer may create the encrypted package 304. If the customer 102 purchases a policy package from the solution provider 202, then the solution provider 202 may create the encrypted package 304.

The encrypted package 304 may be downloaded by the customer 102 to a server 306 for deployment to the devices 104. For example, an agent 308 (e.g., software agent) may automatically decrypt the contents of the encrypted package 304 and/or deploy the device IDs 118 and the policy 110(M) to each of the devices 104(1) to 104(N) via an internal network 310.

Figure 4:
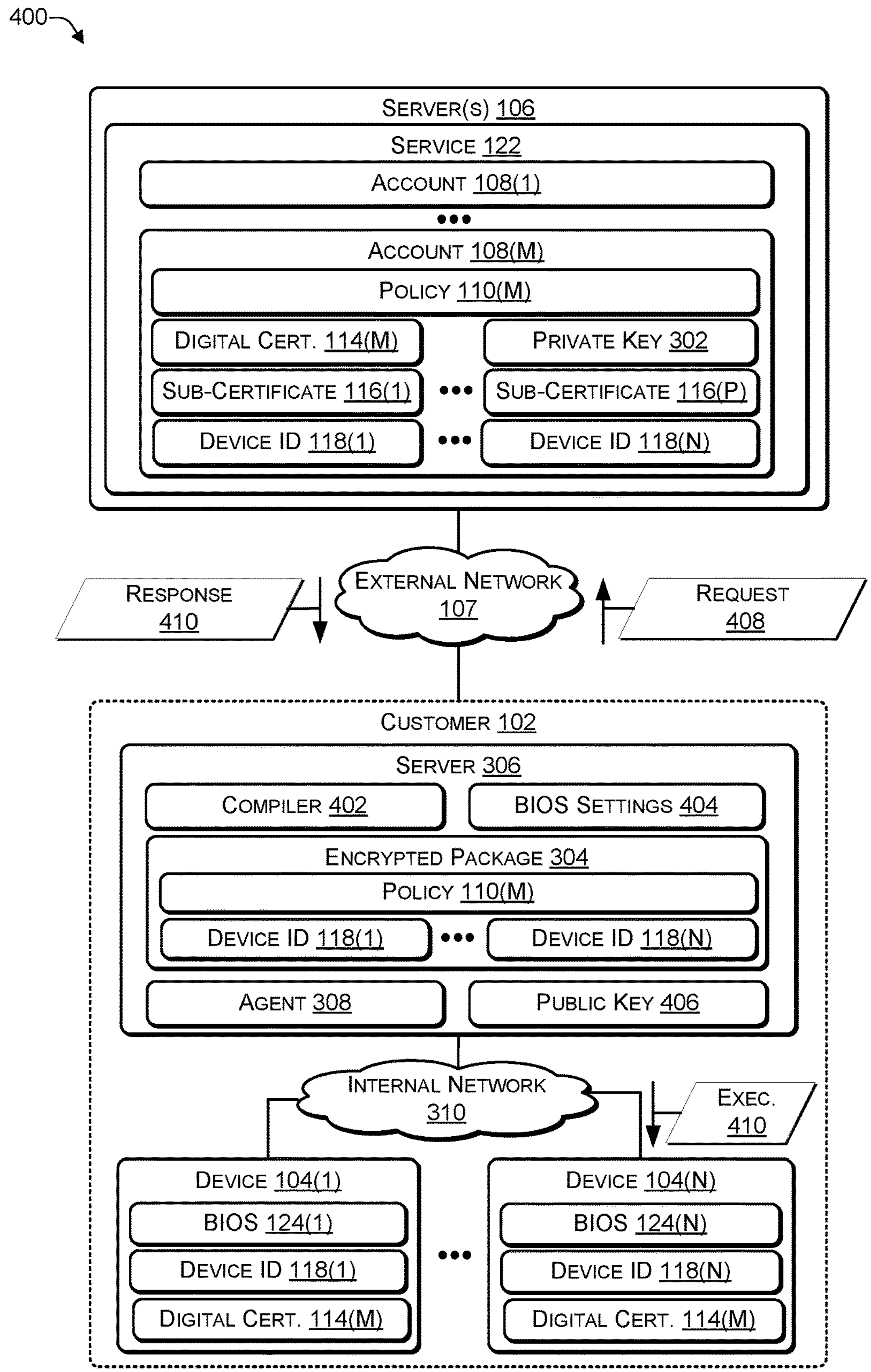
FIG. 4 is a block diagram illustrating an architecture that includes deploying a policy across multiple devices according to some implementations.

FIG. 4 is a block diagram illustrating an architecture 400 that includes deploying a policy across multiple devices according to some implementations. The customer 102 may download the encrypted package 304 to the server 306. The agent 308 may decrypt the contents of the encrypted package 304. The agent 308 may use a compiler 402 to compile the package 304 into BIOS settings 404 for deployment to the devices 104. The compiler 402 may correlate the policy 110(M) with the BIOS 124 of the devices 104 to create feature settings (e.g., feature parameters) and wrap the BIOS feature settings 404 into a delivery mechanism, such as, for example, an executable file, to enable the policy 110(M) to be installed, in the form of the BIOS settings 404, on each of the devices 104. For example, the policy 110(M) may implement a security policy by setting the BIOS feature settings 404 to disable an imaging device (e.g., teleconferencing camera, often referred to as a "webcam"), disable audio input devices (e.g., microphones), disable particular ports, disable another component of the devices 104, or any combination thereof.

The BIOS settings 404 and a corresponding one of the device IDs 118 may be sent to each of the devices 104(1) to 104(N) in an executable 410 for installation. For example, the BIOS settings 404 and the device ID 118(1) may be packaged into the executable file 410 and sent to the device 104(1). The BIOS settings 404 and the device ID 118(N) may be packaged into the executable file 410 and sent to the device 104(N). In some cases, the BIOS settings 404 may be validated before being installed on each of the devices 104. In other cases, the BIOS settings 44 may be validated after being installed on each of the devices 104. Both of these cases are described in detail below.

Validating BIOS Settings Prior To Installation

After the BIOS settings 404 are sent to and stored on each of the devices 104, the service 122 may verify that the policy 110(M) that is being enforced by the BIOS settings 404 is a valid policy. For example, each of the devices 104 may boot/re-boot (e.g., prior to installing the BIOS settings 404) and use a local public key 406 (e.g., the digital certificate 114(M)) along with each device's unique device ID 118 to validate the policy 110(M) (e.g., as implemented using the BIOS settings 404) with the service 122. For example, the BIOS settings 404 may include information identifying the particular policy being implemented. To illustrate, the BIOS settings 404 may include an identifier "Policy AW0005" indicating that this is the fifth policy created by solution provider Air Watch (AW). To illustrate, after the BIOS settings 404 have been sent by the agent 308 and stored on a particular one of the devices 104, the particular device may re-boot in preparation to install the BIOS settings 404. Typically, BIOS features, BIOS updates, and the like may be installed prior to booting the operating system of a computing device. During the re-boot, the particular device may send a validate request 408 that includes the public key 406 (e.g., the digital certificate 114(M) associated with the account 108(M)) and the unique device ID 118. The service 122 may validate the public key 406 and/or validate the device ID 118 against the device IDs associated with the account 108(M). For example, the public key 406 may be used to verify whether the policy 110(M) came from the service 122. If the service 122 verifies the public key 406, the device ID 118, or both, the service 122 may send a response 410 indicating that the policy 110(M) is to be trusted and the device 104 may proceed to install the BIOS settings 404, e.g., by configuring the features of the BIOS 124 according to the BIOS settings 404. If the service 122 is unable to verify the public key 406, the device ID 118, or both, the service 122 may send the response 410 indicating that the policy 110(M) is not to be trusted. In response, the device 104 may not install the BIOS settings 404, and may take one or more corrective actions, such as, for example, deleting the BIOS settings 404 (e.g., without installing the BIOS settings 404), notifying a system administrator, displaying a message indicating that an attempt was made to install unverified BIOS settings, or any combination thereof. The public key 406 may comprise (or be derived from) the digital certificate 114(M). The digital certificate 114(M) may be stored on the servers 106 by the service 122 and may be stored on each of the devices 104.

Validating BIOS Settings After Installation

After the BIOS settings 404 are sent to and stored on each of the devices 104, the service 122 may verify that the policy 110(M) that is being enforced by the BIOS settings 404 is a valid policy. For example, the BIOS settings 404 may include information identifying the particular policy being implemented. To illustrate, the BIOS settings 404 may include an identifier "Policy AW0005" indicating that this is the fifth policy created by solution provider Air Watch (AW). Each of the devices 104 may boot/re-boot (e.g., after installing the BIOS settings 404) and use a local public key 406 along with each device's unique device ID 118 to validate the policy 110(M) (e.g., as implemented using the BIOS settings 404) with the service 122. To illustrate, after the BIOS settings 404 have been sent by the agent 308 and stored on a particular one of the devices 104, the particular device may re-boot and install the BIOS settings 404. During the re-boot, after the policy 110(M) (e.g., as implemented using the BIOS settings 404) has been installed, the particular device may send a validate request 408 that includes the public key 406 (e.g., the digital certificate 114(M) associated with the account 108(M)) and the unique device ID 118. The service 122 may validate the public key 406 and/or validate the device ID 118 against the device IDs associated with the account 108(M). For example, the public key 406 may be used to verify whether the policy 110(M) came from the service 122. If the service 122 verifies the public key 406, the device ID 118, or both, the service 122 may send a response 410 indicating that the policy 110(M) is to be trusted and the device 104 may complete the boot process. If the service 122 is unable to verify the public key 406, the device ID 118, or both, the service 122 may send the response 410 indicating that the policy 110(M) is not to be trusted. In response, the device 104 may uninstall the BIOS settings 404, and may take one or more corrective actions, such as, for example, configuring the BIOS settings to the settings that were used prior to the installation of the BIOS settings 404, resetting the BIOS settings to default settings, notifying a system administrator, displaying a message indicating that an attempt was made to install unverified BIOS settings, or any combination thereof.

In the flow diagrams of FIGS. 5, 6, 7, 8, and 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, 700, 800, and 900 are described with reference to FIGS. 1, 2, 3, and 4, as described above, although other models, frameworks, systems and environments may implement these processes.

Figure 5:
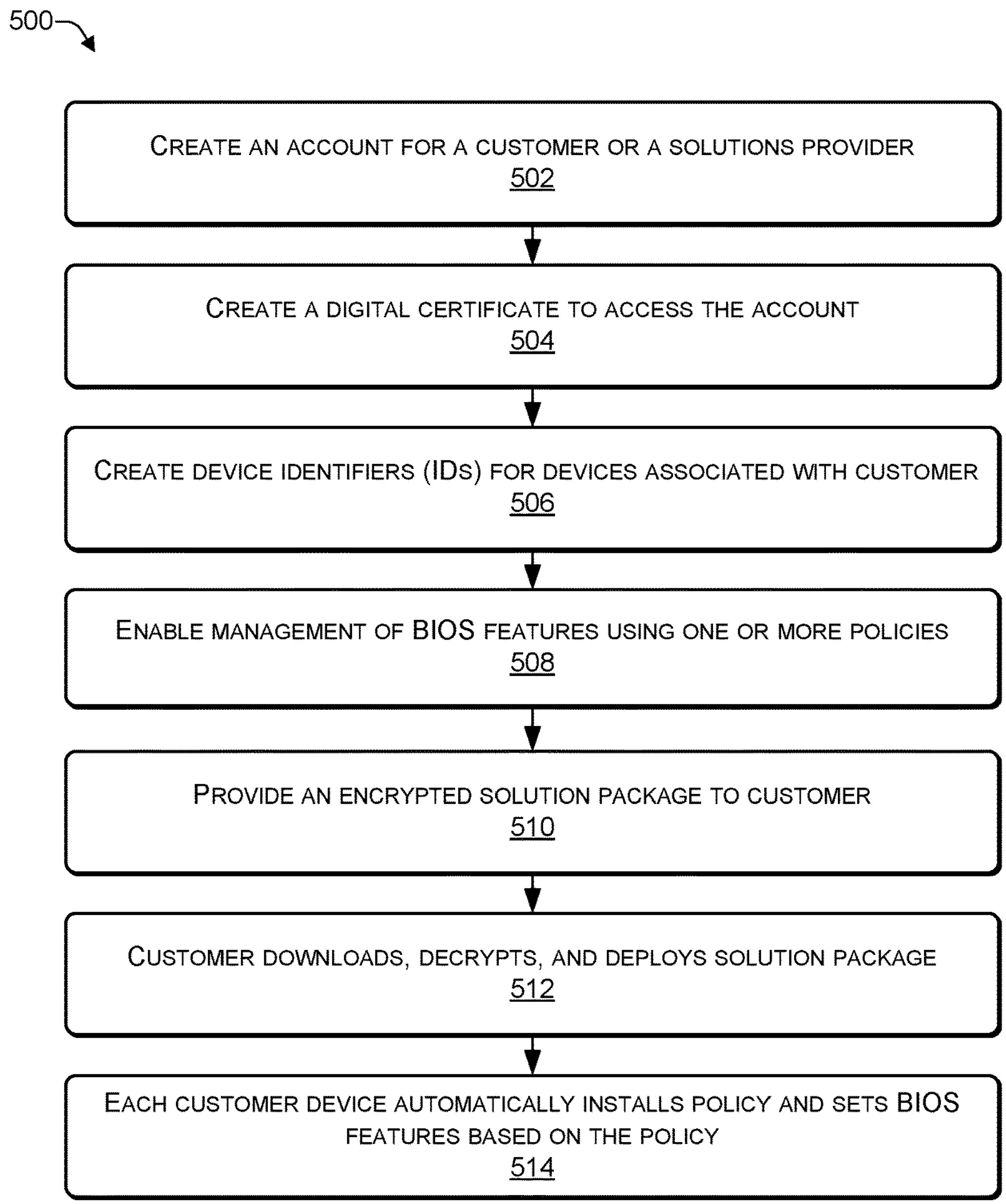
FIG. 5 is a flowchart of a process that includes provisioning an account for a customer or a solutions provider according to some implementations.

FIG. 5 is a flowchart of a process 500 that includes provisioning an account for a customer or a solutions provider according to some implementations. The process 500 may be performed by the service 122 of FIGS. 1, 2, 3, and 4.

At 502, an account for a customer or a solutions provider may be created. At 504, credentials, such as a digital certificate, may be created to enable the customer or the solution provider to access the account and to prevent unauthorized access. At 506, a device identifier (ID) may be created for each device associated with the customer. For example, in FIG. 1, the customer 102 may acquire the devices 104 and request that the service 122 create an account. In response, the service 122 may create the account 108(M) associated with the customer 102. The account 108(M) may be accessed using digital certificate 114(M). For example, the digital certificate 114(M) may enable the service 122 to authenticate the customer 102 and the devices 104 and prevent unauthorized users from accessing the account 108(M). The service 122 may create device IDs 118 corresponding to each of the devices 104, with device ID 118(1) corresponding to device 104(1) and device ID 118(N) to device 104(N). 502, 504, and 506 are described in more detail in FIG. 6.

At 508, one or more policies may be used to manage features (e.g., by modifying settings) of the BIOS installed in each device associated with the customer. For example, in FIG. 2, the service 122 may enable the customer 102 or the solution provider 202 to define one or more policies that can be translated (e.g., compiled) into BIOS feature settings. For example, a particular policy may disable an imaging device (e.g., webcam) and an audio input device (e.g., microphone) to prevent such components of the computing devices 104 from being hijacked by an unauthorized user to obtain confidential, classified, restricted or other information. For example, unauthorized parties may be prevented from hijacking a webcam and to watch a user type in passwords and the like. As another example, unauthorized parties may be prevented from hijacking a microphone to obtain competitive information from a research and development (R&D) facility. 508 is described in more detail in FIG. 7.

Figure 8:
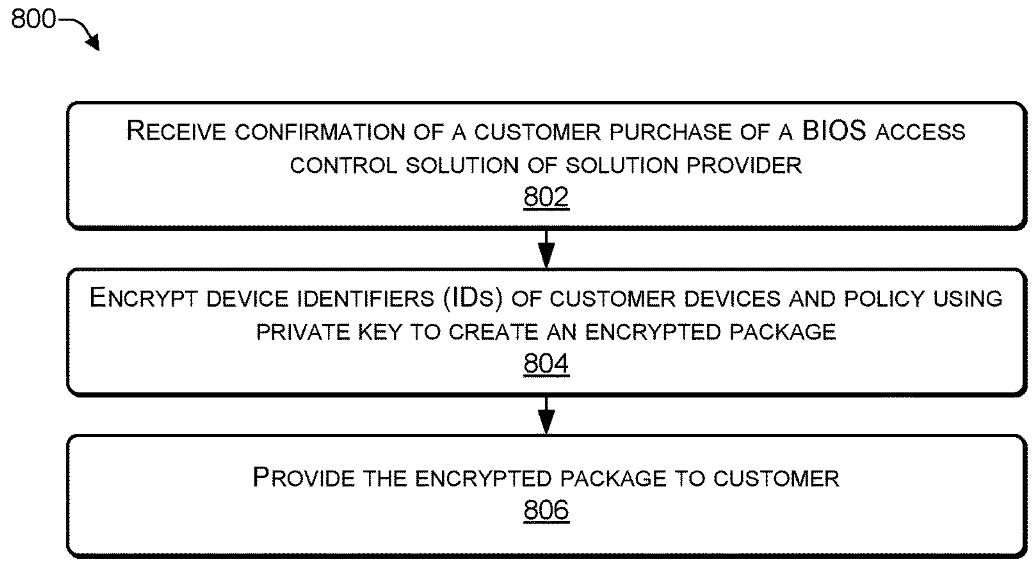
FIG. 8 is a flowchart of a process that includes providing a solution package according to some implementations.

At 510, an encrypted solution package may be provided to the customer. 510 is described in more detail in FIG. 8. At 512, the customer may download, decrypt, and deploy the solution package. At 514, each customer device may automatically install a policy and set BIOS features to implement the policy. For example, in FIG. 4, the agent 308 may download the encrypted package 304 to the server 306, decrypt the contents of the package 304, and deploy the policy 110(M) to each of the devices 104. Each of the devices 104 may automatically install the policy 110(M) by implementing the BIOS feature settings 404 that implement the policy 110(M). For example, the agent 308 may create an executable file and send the executable file to each of the devices 104. Each of the devices 104 may execute the executable file to modify each BIOS 124 according to the policy 110(M). 510, 512 are described in more detail in FIG. 9.

Figure 6:
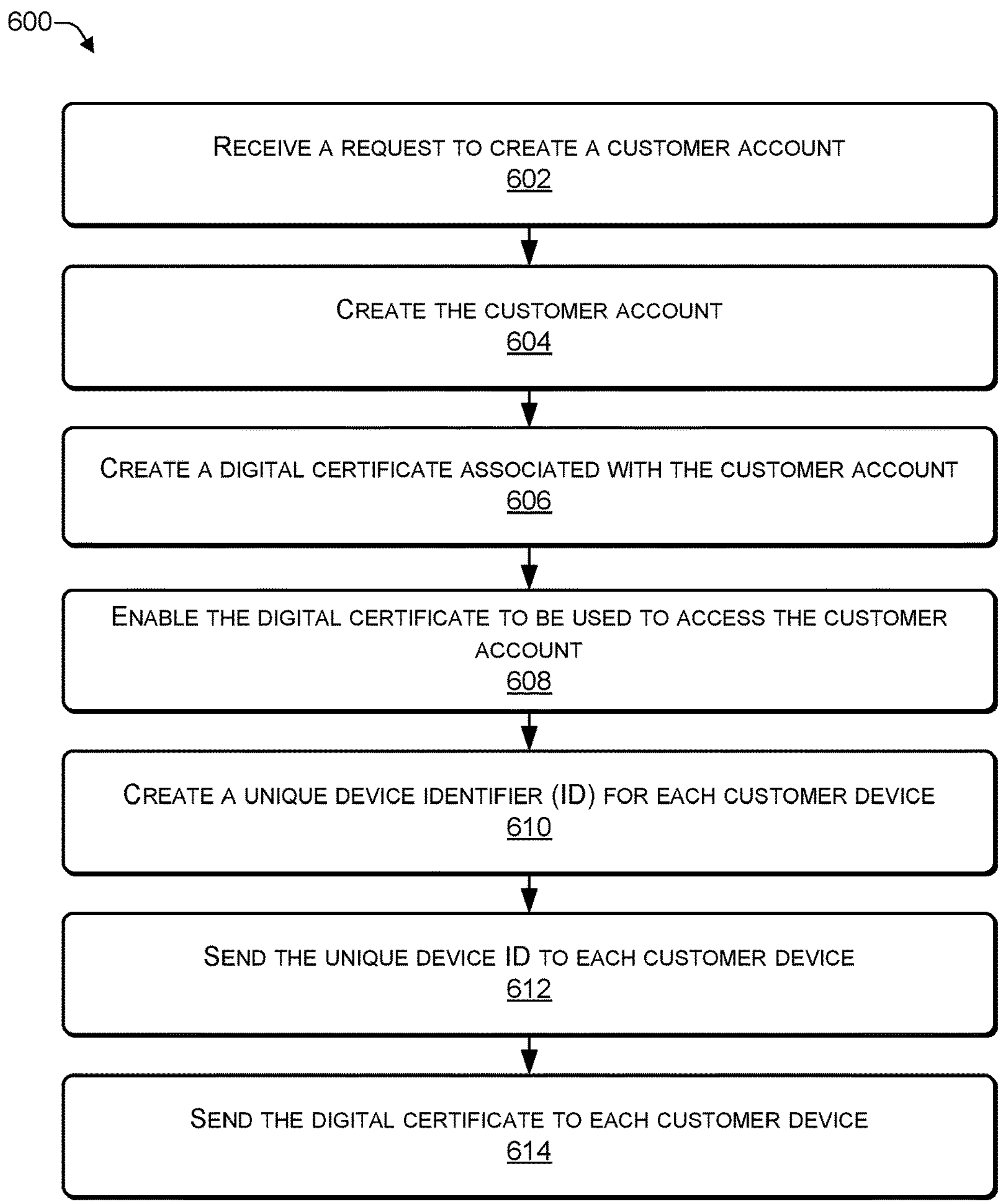
FIG. 6 is a flowchart of a process that includes receiving a request to create a customer account according to some implementations.

FIG. 6 is a flowchart of a process 600 that includes receiving a request to create a customer account according to some implementations. The process 600 may be performed by the service 122 of FIGS. 1, 2, 3, and 4.

At 602, a request to create a customer account may be received. At 604, the customer account may be created. At 606, a digital certificate associated with the customer account may be created. At 608, the digital certificate may be enabled to access the customer account. For example, in FIG. 1, the customer 102 may acquire the devices 104. The customer 102 (or the solution provider 202 of FIG. 2) may send a request to the service 122 to create an account for the customer 102. In response, the service 122 may create the account 108(M) associated with the customer 102. The service 122 may create the digital certificate 114(M) and enable the account 108(M) to be accessed using the digital certificate 114(M). For example, the digital certificate 114(M) may enable the service 122 to authenticate the customer 102 and the devices 104 while preventing unauthorized users from accessing the account 108(M).

At 610, a unique device ID may be created for each customer device. At 612, the unique device ID may be sent to the corresponding customer device. At 614, the digital certificate may be sent to each customer device. For example, in FIG. 1, the service 122 may create the device IDs 118 corresponding to each of the devices 104, e.g., with device ID 118(1) corresponding to device 104(1) and device ID 118(N) to device 104(N). The service 122 may send the device ID 118(1) and the digital certificate 114(M) to the device 104(1) and may send the device ID 118(N) and the digital certificate 114(M) to the device 104(N). The digital certificate 114(M) may be used to authenticate the devices 104 when a policy associated with the customer account is installed.

Figure 7:
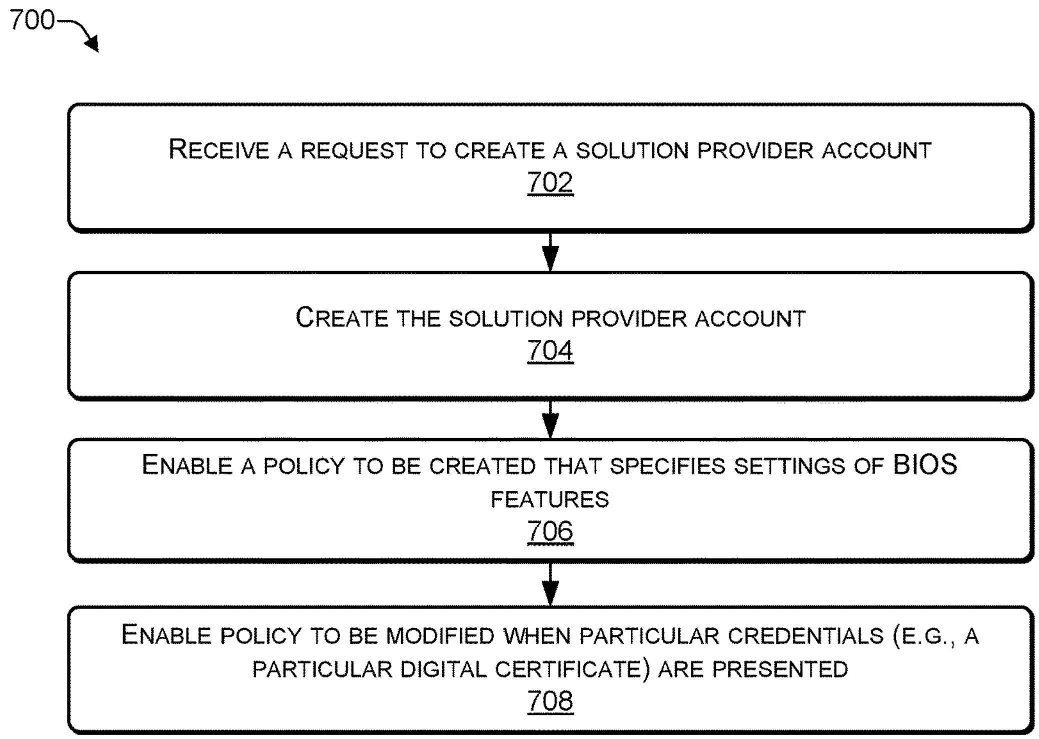
FIG. 7 is a flowchart of a process that includes receiving a request to create a solution provider account according to some implementations.

FIG. 7 is a flowchart of a process 700 that includes receiving a request to create a solution provider account according to some implementations. The process 700 may be performed by the service 122 of FIGS. 1, 2, 3, and 4.

At 702, a request to create a solution provider account may be received. At 704, the solution provider account may be created. For example, in FIG. 2, the customer 102 may acquire the devices 104. The solution provider 202 of FIG. 2 may send a request to the service 122 to create an account. In response, the service 122 may create the account 108(M) associated with the solution provider 202.

At 706, the solution provider may be provided with the ability to create one or more policies that specify (or can be translated into) settings of BIOS features. At 708, the solution provider may be provided with the ability to access the account to modify the policy by presenting particular credentials, such as, for example, a digital certificate. For example, in FIG. 1, the service 122 may create the digital certificate 114(M) and enable the account 108(M) to be accessed using the digital certificate 114(M). For example, the digital certificate 114(M) may enable the service 122 to authenticate the solution provider 202 while preventing unauthorized users from accessing the account 108(M). After presenting the digital certificate 114(M), the service 122 may provide the solution provider 202 with access to the account 108(M), including the ability to create and modify policies, such as the policy 110(M).

FIG. 8 is a flowchart of a process 800 that includes providing a solution package according to some implementations. The process 800 may be performed by the service 122 of FIGS. 1, 2, 3, and 4.

At 802, a confirmation may be received that a customer purchased a BIOS access control solution of a solution provider. For example, in FIG. 3, the solution provider 202 may notify the service 122 that the customer 102 purchased a BIOS access control solution (e.g., one or more policies that are implemented using BIOS feature settings) from the solution provider 202.

At 804, device identifiers (IDs) of customer devices and one or more policies may be encrypted using a private key (e.g., a digital certificate) to create an encrypted package. For example, in FIG. 3, the service 122 may create the package 304 that includes the policy 110(M) and the device IDs 118. The package 304 may be encrypted using the private key 302.

At 806, the encrypted package may be provided (e.g., sent or made available for download) to the customer. In some cases, the service 122 may send the encrypted package 304 to the customer 102. In other cases, the service 122 may place the encrypted package 304 in a downloadable location (e.g., accessible using secure file transfer protocol (FTP) or similar), notify the customer 102 as to the location, and the customer 102 may download the encrypted package 304 from the location and store it on an enterprise server, such as the server 306.

Figure 9:
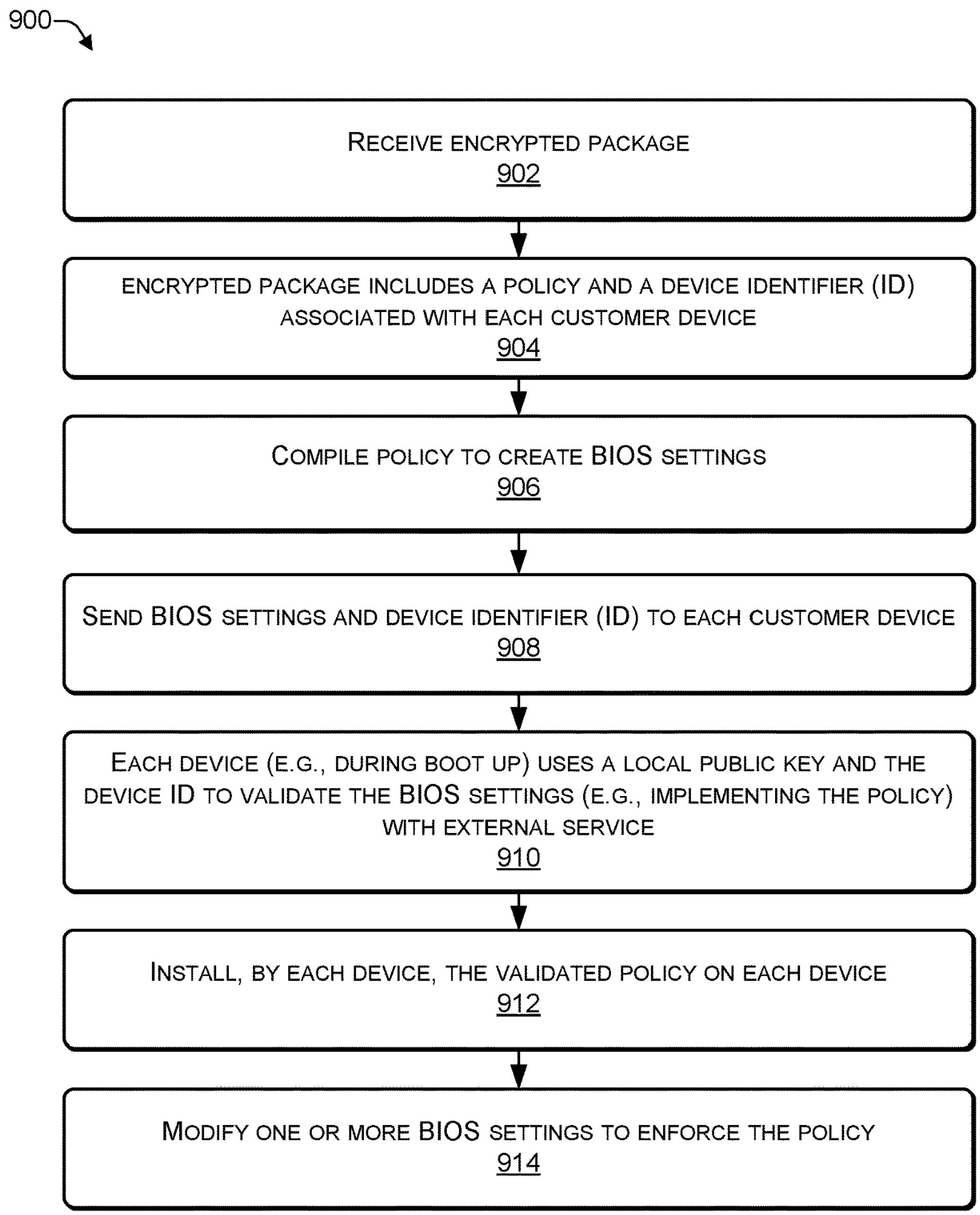
FIG. 9 is a flowchart of a process that includes setting one or more BIOS features based on a policy according to some implementations.

FIG. 9 is a flowchart of a process 900 that includes setting one or more BIOS features based on a policy according to some implementations. The process 900 may be performed by a software application associated with the customer 102, such as, for example, the agent 308.

At 902, the encrypted package may be received (or retrieved). At 904, the encrypted package may include a policy and a device ID associated with each customer device. For example, in FIG. 4, the customer 102 may receive (or retrieve) the encrypted package 304 from the service 122. The encrypted package 304 may include the policy 110(M) and the device IDs 118 corresponding to the devices 104 acquired by the customer 102.

At 906, the policy may be compiled to create BIOS feature settings (e.g., that may be used to configure the BIOS of each customer device). For example, in FIG. 3, the agent 308 may use the compiler 404 to compile (e.g., convert) the policy 110(M) into the BIOS settings 404. The BIOS settings 404, when installed on the devices 104, may enforce the policy 110(M).

At 908, the BIOS settings and a device identifier may be sent to each customer device. For example, in FIG. 3, the agent 308 may package (e.g., wrap) the policy 110(M) and individual device IDs 118 into the executable file 410 and sent to individual ones of the devices 104. For example, the BIOS settings 404 and the device ID 118(N) may be packaged into the executable file 410 and sent to the device 104(N). The BIOS settings 404 may enforce the policy 110(M)>

At 910, each device may initiate a boot process. During the boot process, each device may use a local public key and the device ID to validate the policy associated with the BIOS settings with an external service. For example, in FIG. 4, after the BIOS settings 404 are sent to and stored on each of the devices 104, the service 122 may verify that the policy 110(M) is a valid policy. For example, each of the devices 104 may boot/re-boot (e.g., prior to or after installing the BIOS settings 404) and use a local public key 406 along with each device's unique device ID 118 to validate the policy 110(M) identified in and implemented by the BIOS settings 404 with the service 122. For example, the BIOS settings 404 may include information identifying the particular policy being implemented. To illustrate, the BIOS settings 404 may include an identifier "Policy AW0005" indicating that this is the fifth policy created by solution provider Air Watch (AW). During a boot process, the particular device may send a validate request 408 that includes the public key 406 (e.g., the digital certificate 114(M) associated with the account 108(M)) and the unique device ID 118. The service 122 may validate the public key 406 and/or validate the device ID 118 against the device IDs associated with the account 108(M). For example, the public key 406 may be used to verify whether the policy 110(M) came from the service 122. If the service 122 verifies the public key 406, the device ID 118, or both, the service 122 may send a response 410 indicating that the policy 110(M) is to be trusted and the device 104 may proceed to install the BIOS settings 404, e.g., by configuring the features of the BIOS 124 according to the BIOS settings 404. If the service 122 is unable to verify the public key 406, the device ID 118, or both, the service 122 may send the response 410 indicating that the policy 110(M) is not to be trusted. In response, the device 104 may not install the BIOS settings 404, and may take one or more corrective actions, such as, for example, deleting the BIOS settings 404 (e.g., without installing the BIOS settings 404), uninstalling the BIOS settings 404, notifying a system administrator, displaying a message indicating that an attempt was made to install unverified BIOS settings, or any combination thereof. The public key 406 may comprise (or be derived from) the digital certificate 114(M). The digital certificate 114(M) may be stored on the servers 106 by the service 122 and may be stored on each of the devices 104.

At 912, the validated policy may be installed on each device. At 914, one or more BIOS feature settings may be modified based on the policy. For example, in FIG. 4, if the response 410 from the server 122 indicates that the policy 110(M) identified in the BIOS 124(N) is valid, then the validated BIOS settings 404 may be installed into the BIOS 124 of each device. For example, each device may execute the executable file 410 to configure the BIOS 124 according to the validated BIOS settings 404. The BIOS settings 404 may enforce the policy 110(M) by, for example, disabling certain components, such as the webcam, microphone, specific ports (e.g., ThunderBolt®), and the like.

Figure 10:
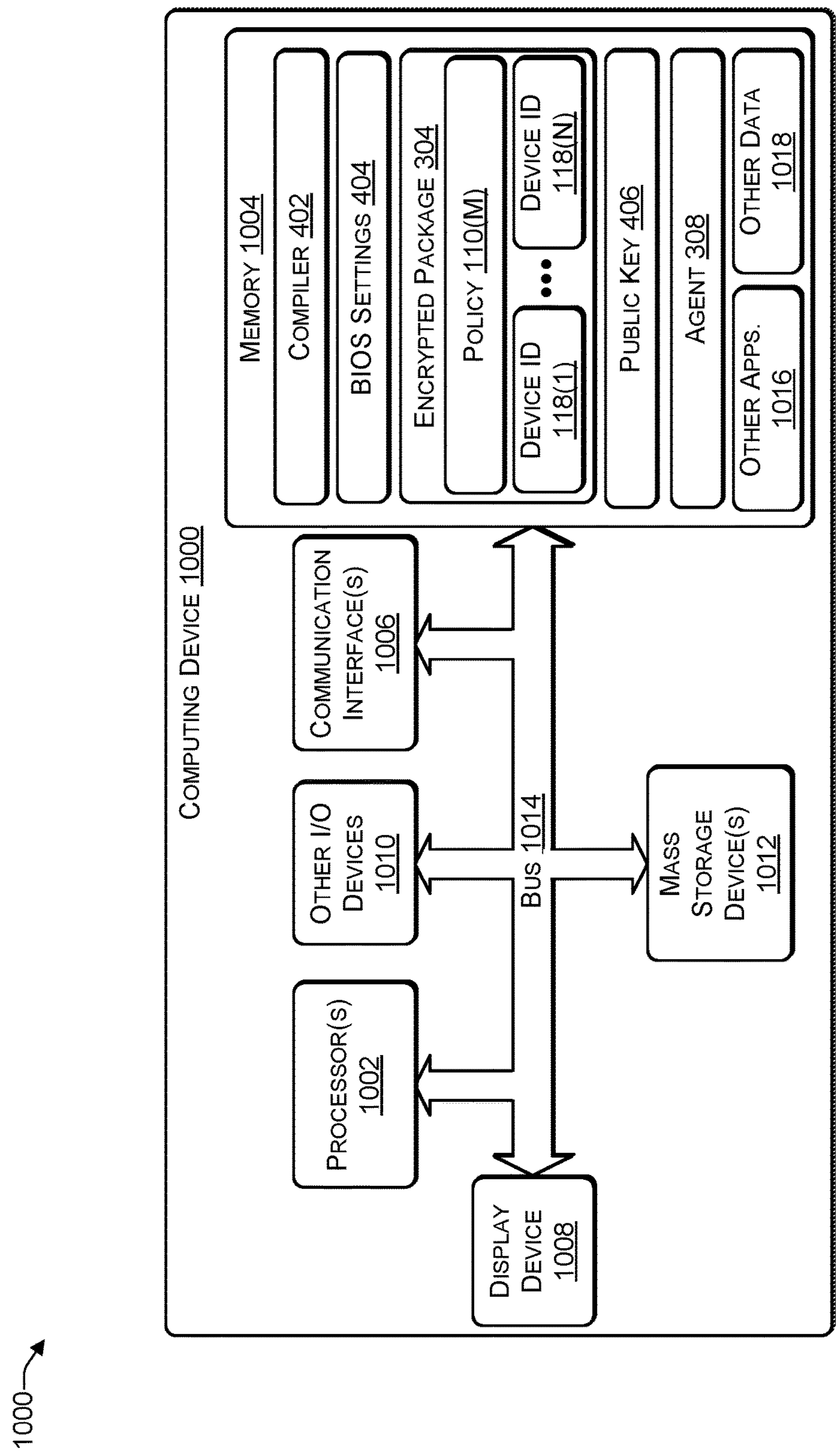
FIG. 10 illustrates an example configuration of a computing device that can be used to implement the systems and techniques described herein.

FIG. 10 illustrates an example configuration of a computing device 1000 that can be used to implement the systems and techniques described herein, such as, for example, one or more of the servers 106 of FIG. 1, the devices 104, the server 306 of FIG. 3, or the like. The computing device 1000 may include one or more processors 1002, the memory 1004, communication interfaces 1006, a display device 1008, other input/output (I/O) devices 1010 (e.g., keyboard, trackball, and the like), and one or more mass storage devices 1012, configured to communicate with each other, such as via one or more system buses 1014 or other suitable connections. While a single system bus is illustrated for ease of understanding, it should be understood that the system buses 1014 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 1002 are hardware devices (e.g., integrated circuits) that may include a single processing unit or a number of processing units, all of which may include single or multiple computing units or multiple cores. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 1004, mass storage devices 1012, or other computer-readable media.

Memory 1004 and mass storage devices 1012 are examples of computer storage media (e.g., memory storage devices) for storing instructions that can be executed by the processors 1002 to perform the various functions described herein. For example, memory 1004 may include both volatile memory and non-volatile memory (e.g., RAM, ROM, or the like) devices. Further, mass storage devices 1012 may include hard disk drives, solid-state drives, removable media, including external and removable drives, memory cards, flash memory, floppy disks, optical disks (e.g., CD, DVD), a storage array, a network attached storage, a storage area network, or the like. Both memory 1004 and mass storage devices 1012 may be collectively referred to as memory or computer storage media herein, and may be any type of non-transitory storage media capable of storing computer-readable, processor-executable program instructions as computer program code that can be executed by the processors 1002 as a particular machine configured for carrying out the operations and functions described in the implementations herein.

The computing device 1000 may also include one or more communication interfaces 1006 for exchanging data via a network. The communication interfaces 1006 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 1006 can also provide communication with external storage, such as a storage array, network attached storage, storage area network, cloud storage, or the like.

Other I/O devices 1010 may be devices that receive various inputs from a user and provide various outputs to the user, and may include a keyboard, a touchpad, a mouse, a printer, audio input/output devices, and so forth.

The computer storage media, such as memory 1004 and mass storage devices 1012, may be used to store software and data. For example, in the case of the server 306, the computer storage media may be used to store the compiler 402, the BIOS settings 404, the encrypted package 304 (e.g., including the policy 110(M) and device IDs 118), the public key 406, the agent 308, other applications 106, and other data 1018. As another example, in the case of the servers 106, the computer storage media may be used to store the service 122, the accounts 108 of FIG. 1, and the like. As a further example, in the case of the devices 104, the computer storage media may be used to store the BIOS 124, the device ID 118, and the like.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

receiving, by one or more processors of a computing device, settings associated with one or more features of a basic input output system (BIOS) of the computing device;

receiving, by the one or more processors, a device identifier that uniquely identifies the computing device;

determining, by the one or more processors, a policy identifier that identifies a policy being implemented by the settings associated with the one or more features of the BIOS;

retrieving, by the one or more processors, a public key associated with an organization that acquired the computing device;

sending to a service, by the one or more processors, a request to validate the policy, the request including the policy identifier and the public key;

receiving, by the one or more processors, a response indicating that the policy is valid;

initiating, by the one or more processors, a reboot; and modifying, by the one or more processors and during the reboot, the one or more features of the BIOS of the computing device based on the settings.

2. The method of claim 1, wherein the settings associated with the one or more features of the BIOS comprise at least one of:

disabling an imaging device associated with the computing device;

disabling a microphone associated with the computing device; or disabling a port associated with the computing device.

3. The method of claim 1, further comprising:

downloading, by a software agent associated with the organization, an encrypted package from the service, wherein the encrypted package includes the policy and a plurality of device identifiers.

4. The method of claim 3, further comprising:

compiling, by the software agent, the policy to create the settings associated with the one or more features of the BIOS.

5. The method of claim 3, further comprising:

sending, by the software agent, an executable file to a particular computing device of a plurality of computing devices acquired by the organization, the executable file including:

the settings associated with the one or more features of the BIOS; and a particular device identifier of the plurality of device identifiers that corresponds to the particular computing device.

6. The method of claim 1, wherein:

the settings associated with the one or more features of the BIOS include a policy identifier identifying a particular policy of a plurality of policies;

the settings implement the particular policy.

7. A computing device comprising:

one or more processors; and one or more non-transitory computer-readable storage media to store instructions executable by the one or more processors to perform operations comprising:

receiving settings associated with one or more features of a basic input output system (BIOS) of the computing device;

receiving a device identifier that uniquely identifies the computing device;

determining a policy identifier that identifies a policy being implemented by the settings associated with the one or more features of the BIOS;

retrieving a public key associated with an organization that acquired the computing device;

sending a request to a service to validate the policy, the request including the policy identifier and the public key;

receiving a response from the service;

based at least in part on determining that the response indicates that the policy is valid:

initiating a reboot; and modifying, during the reboot, the one or more features of the BIOS of the computing device based on the settings.

8. The computing device of claim 7, the operations further comprising:

based at least in part on determining that the response indicates that the policy is invalid:

deleting the settings associated with the one or more features of the BIOS; and providing a message indicating that the settings are invalid.

9. The computing device of claim 7, wherein the settings associated with the one or more features of the BIOS comprise at least one of:

disabling a camera associated with the computing device;

disabling a microphone associated with the computing device; or disabling a port associated with the computing device.

10. The computing device of claim 7, wherein:

the policy is compiled to create the settings associated with the one or more features of the BIOS.

11. The computing device of claim 7, wherein:

the service includes an account associated with the organization;

the account includes the policy; and the account is accessed by presenting a digital certificate associated with the account.

12. The computing device of claim 7, wherein:

the policy is created by a solution provider that is different from the organization.

13. The computing device of claim 7, wherein:

the settings associated with the one or more features of the BIOS include a policy identifier identifying a particular policy of a plurality of policies; and the settings implement the particular policy.

14. One or more non-transitory computer-readable storage media to store instructions executable by one or more processors of a target device to perform operations comprising:

receiving settings associated with one or more features of a basic input output system (BIOS) of the computing device;

receiving a device identifier that uniquely identifies the computing device;

determining a policy identifier that identifies a policy being implemented by the settings associated with the one or more features of the BIOS;

initiating a reboot;

modifying, during the reboot, the one or more features of the BIOS of the computing device based on the settings;

retrieving a public key associated with an organization that acquired the computing device;

sending a request to a service to validate the policy, the request including the policy identifier and the public key;

receiving a response from the service;

based at least in part on determining that the response indicates that the policy is valid, marking the BIOS as validated.

15. The one or more non-transitory computer-readable storage media of claim 14, further comprising:

based at least in part on determining that the response indicates that the policy is invalid:

restoring the one or more features of the BIOS to one or more previous settings;

deleting the settings associated with the one or more features of the BIOS; and providing a message indicating that the settings are invalid.

16. The one or more non-transitory computer-readable storage media of claim 14, wherein the settings associated with the one or more features of the BIOS comprise at least one of:

disabling a camera associated with the computing device;

disabling a microphone associated with the computing device; or disabling a port associated with the computing device.

17. The one or more non-transitory computer-readable storage media of claim 14, wherein:

the policy is compiled to create the settings associated with the one or more features of the BIOS.

18. The one or more non-transitory computer-readable storage media of claim 14, further comprising:

downloading, by a software agent associated with the organization, an encrypted package from the service, wherein the encrypted package includes the policy and a plurality of device identifiers.

19. The one or more non-transitory computer-readable storage media of claim 18, further comprising:

sending, by the software agent, an executable file to a particular computing device of a plurality of computing devices acquired by the organization, the executable file including:

the settings associated with the one or more features of the BIOS; and a particular device identifier of the plurality of device identifiers that corresponds to the particular computing device.

20. The one or more non-transitory computer-readable storage media of claim 14, wherein:

the settings associated with the one or more features of the BIOS include a policy identifier identifying a particular policy of a plurality of policies; and the settings implement the particular policy.

* * * * *